(12) United States Patent
Hauck

(10) Patent No.: US 9,683,609 B1
(45) Date of Patent: Jun. 20, 2017

(54) FLEXIBLE COUPLINGS WITH IMPROVED TORQUE TRANSMITTING INSERT

(71) Applicant: Jerry L. Hauck, Broussard, LA (US)

(72) Inventor: Jerry L. Hauck, Broussard, LA (US)

( * ) Notice: Subject to any disclaimer, the term of this patent is extended or adjusted under 35 U.S.C. 154(b) by 0 days.

(21) Appl. No.: 15/264,439

(22) Filed: Sep. 13, 2016

(51) Int. Cl.
*F16D 3/68* (2006.01)
*F16D 3/64* (2006.01)

(52) U.S. Cl.
CPC ...... *F16D 3/64* (2013.01); *F16D 3/68* (2013.01)

(58) Field of Classification Search
CPC . F16D 1/0864; F16D 3/12; F16D 3/64; F16D 3/68; F16D 3/78
USPC ........ 464/73–76, 83, 88, 89, 92–94, 96, 149
See application file for complete search history.

(56) References Cited

U.S. PATENT DOCUMENTS

| | | | |
|---|---|---|---|
| 2,857,777 A * | 10/1958 | Porter | F16D 3/74 464/88 |
| 3,837,179 A * | 9/1974 | Barth | F16D 3/68 464/76 |
| 5,139,460 A | 8/1992 | Hoyt et al. | |
| 5,295,911 A | 3/1994 | Hoyt et al. | |
| 5,657,525 A | 8/1997 | Hoyt et al. | |
| 5,738,585 A | 4/1998 | Hoyt et al. | |
| 5,908,355 A | 6/1999 | Hoyt et al. | |
| 6,019,684 A | 2/2000 | Hoyt et al. | |
| 6,024,644 A | 2/2000 | Hoyt et al. | |
| 6,875,112 B2 * | 4/2005 | te Uhle | F16D 3/68 464/83 |
| 7,244,186 B2 * | 7/2007 | Hauck | F16D 3/68 464/75 |
| 7,625,290 B2 * | 12/2009 | Hodjat | F16D 3/68 464/75 |
| 9,022,872 B2 * | 5/2015 | Daniel | F16D 3/68 464/73 |
| 2003/0220146 A1 * | 11/2003 | Bonninger | F16D 3/68 464/73 |
| 2008/0064506 A1 * | 3/2008 | Lin | F16D 3/68 464/73 |

FOREIGN PATENT DOCUMENTS

| | | | | |
|---|---|---|---|---|
| DE | 2609008 A1 * | 9/1976 | ............ | F16D 3/68 |
| FR | 1123440 A * | 9/1956 | ............ | F16D 3/68 |

* cited by examiner

*Primary Examiner* — Josh Skroupa
(74) *Attorney, Agent, or Firm* — Lapple Ubell IP Law, LLC; Franklin D. Ubell

(57) ABSTRACT

A flexible coupling and flexible belt or insert therefor, the belt or insert comprising a plurality of equally spaced circumferentially disposed identically shaped lobes centrally joined together by radial segments of a constant width.

23 Claims, 5 Drawing Sheets

FLEXIBLE COUPLINGS WITH IMPROVED TORQUE TRANSMITTING INSERT

BACKGROUND OF THE DISCLOSURE

Field

The subject disclosure pertains to new and improved flexible couplings and, more particularly, to a flexible belt or insert for such couplings having improved torque transmission qualities.

Description of Related Art

Flexible couplings have long been used for the purpose of transmitting rotation from one shaft to another. Such couplings are normally used in order to accommodate comparatively minor shaft alignment problems such as are occasionally encountered because of manufacturing or assembly errors.

Certain particular flexible couplings have been manufactured in the past so as to include two hubs or hub elements which are adapted to be connected to the shafts joined by the coupling. These hubs are each provided with extending lugs, teeth, or ribs serving as holding means so as to be engaged by corresponding projections on a band-like or belt-like motion transmitting means in order to cause the hubs to rotate in synchronism as one of the shafts is rotated. The bands or belts used in these prior couplings have been flexible, somewhat resilient belts capable of being wrapped around the hubs so that the projections on them engage the holding means on the hubs.

A metal band or ring has typically used to retain the belt in position wrapped around the hubs. The interior of the metal band is shaped and dimensioned so that the band may be slid axially relative to the hubs during the assembly and disassembly of the coupling so that the band fits over the belt when the coupling is assembled so as to conform closely to the exterior of the belt.

Some coupling designs have provided a pair of oppositely-disposed axial grooves in the outer surface of the belt and a pair of oppositely-disposed pins in the inner surface of the metal band. The pins are located so as to slide into the grooves as the metal band is installed along a line parallel to the axis of rotation of the hubs. The pins thus position the band and provide a degree of retention. However, if the shafts are grossly misaligned, the metal band will "walk-off" the belt, causing the coupling to come apart. The axial grooves have also been provided with an enlarged central portion such that the pins must be forced through the entrance of the axial groove and then "pop" into place in the central portion to give a tactile indication that the metal band is properly positioned with respect to the flexible belt.

Some prior coupling designs have also employed improved "lock-on" apparatus for improving the retention of the aforementioned metal retainer bands. This improved apparatus employs an axial groove for initially receiving a pin located on the underside of the metal retainer band and a circumferential groove opening into the axial groove and into which the retainer band pin may be rotated.

SUMMARY

The following is a summary of various aspects and advantages realizable according to various embodiments. It is provided as an introduction to assist those skilled in the art to more rapidly assimilate the detailed design discussion which ensues and does not and is not intended in any way to limit the scope of the claims which are appended hereto in order to particularly point out the invention.

Accordingly, in an illustrative embodiment, flexible coupling apparatus is provided comprising an inner hub component and an outer retainer component and a flexible torque transmitting belt or insert adapted to transmit torque between the hub component and retainer component. In an illustrative embodiment, the flexible torque transmitting belt or insert comprises a flexible plastic body having a plurality of equally spaced, circumferentially disposed lobes joined to one another by a plurality of radial segments of constant width. Each lobe has an outer surface adapted to engage the retainer and an inner surface adapted to engage the hub. Each lobe further has an outer surface of a same selected first width and an outer perimeter including a rounded portion disposed between first and second flat sides, the distance between the respective junctions of the flat sides with respective radial segments defining the first width, wherein each rounded portion has a centrally located flat surface at an outer tip thereof. The inner surface of each lobe has a selected second width and an inner perimeter including a rounded portion disposed between first and second flat sides, the distance between the respective junctions of the flat sides with a respective radial segment defining the second width, the rounded portion having a centrally located flat surface at an inner tip thereof. Each lobe further comprises a solid body of flexible or plastic material in the space encompassed by the inner and outer perimeters.

BRIEF DESCRIPTION OF THE DRAWINGS

An illustrative embodiment of a flexible coupling insert and related coupling components will now be described in detail in conjunction with the drawings of which.

DETAILED DESCRIPTION OF PREFERRED EMBODIMENTS

Figure 1:
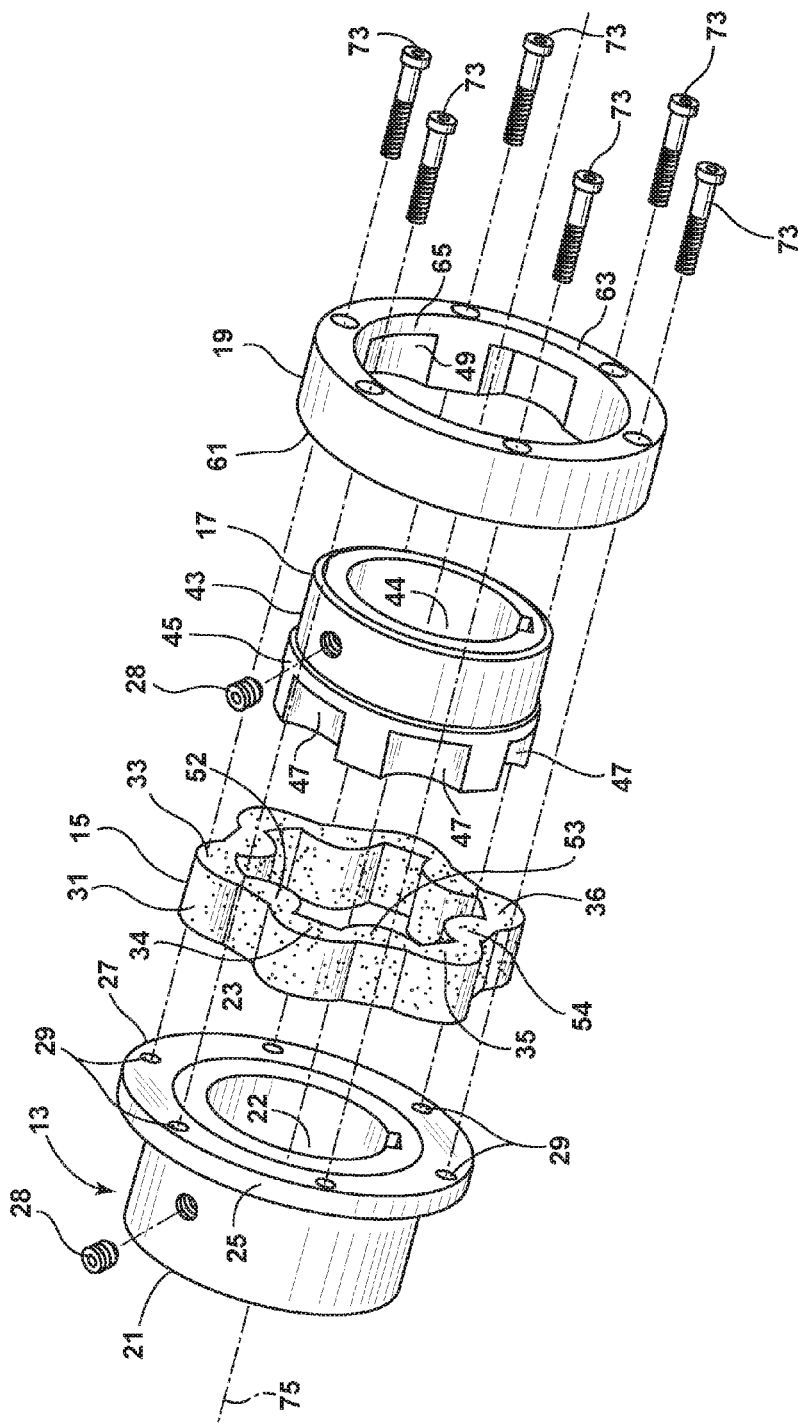
FIG. 1 is an exploded perspective of a prior art flexible coupling.
Figure 2:
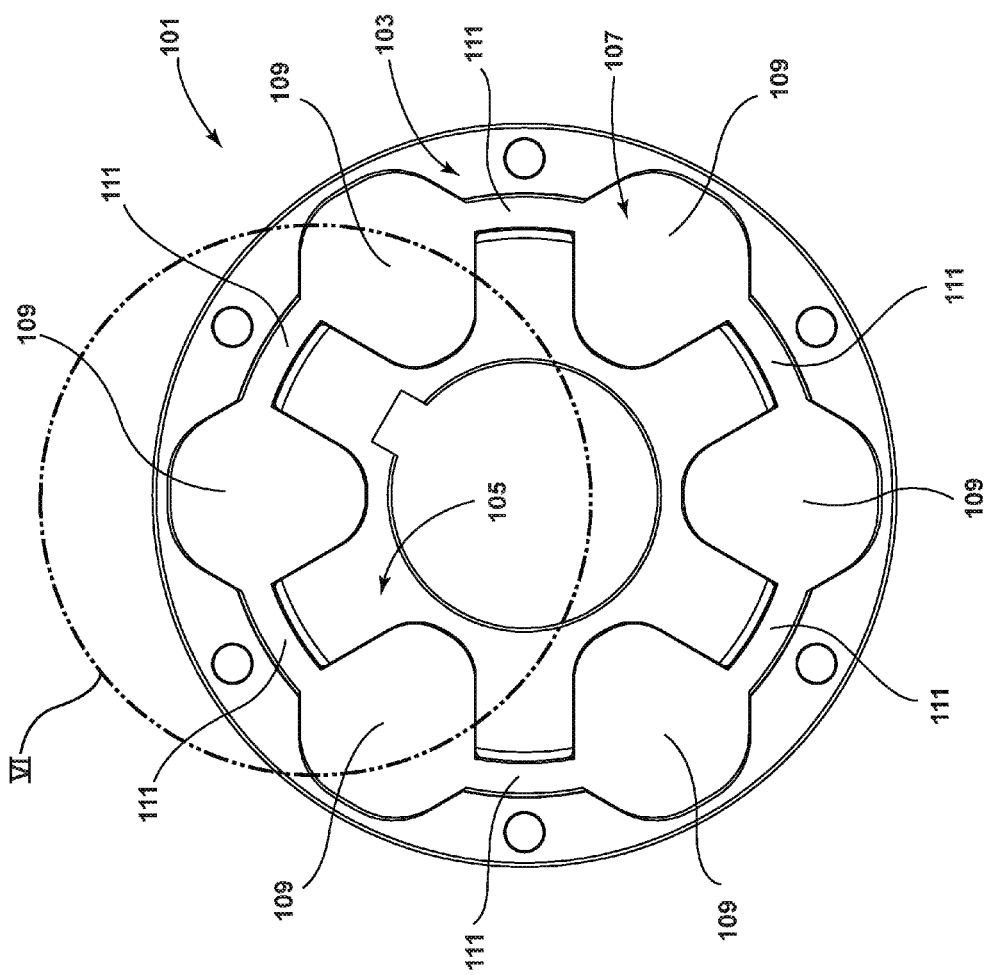
FIG. 2 is a side view of a flexible coupling according to an illustrative embodiment.

A prior art flexible coupling is shown in FIG. 1 and described in detail in U.S. Pat. No. 7,806,771, incorporated by reference herein in its entirety. The flexible coupling of FIG. 1 includes a first hub 13, a flexible insert 15, a second hub 17 and a retainer member 19. In illustrative embodiments, the hubs and retainer may be fabricated of steel or other suitable metals.

The first hub 13 includes an interior bore 22, a first cylindrical segment 21 and a mounting flange 23 having a circular outer edge 25. The face 27 of the flange 23 has a number of mounting holes 29 therein, each of which lies equally spaced on a circle of lesser diameter than that of the outer edge 25. Conventional fastening devices such as a screw 28 may be used to secure the hubs to respective shafts.

The insert 15 may be fabricated from a flexible material such as, for example, a suitable urethane, and is preferably split so as to facilitate "wraparound" installation. The outer surface 31 of the insert 15 features a number of equally spaced exterior lobes 33, 34, 35, 36, 37, 38 projecting therefrom. The lobes, e.g., 33, are formed about equally spaced radii extending from the center of the insert 15. The interior surface of the insert 15 features a number of interiorly projecting lobes 52, 53, 54, 55, 56, 57, which, in the embodiment of FIG. 1, alternate with the exterior lobes 33, 34, etc. In other words, as one proceeds about the circumference of the insert 15 one encounters a first exterior lobe 33, then an interior lobe 52, then a second exterior lobe 34, then a second interior lobe 53, etc.

The second hub 17 includes a cylindrical segment 43 and an insert-mounting segment or portion 45. The insert-mounting portion 45 includes a number of wells or receptacles 47 which are shaped and dimensioned to mate snugly with the interior lobes, e.g., 52, 53, of the insert 15. The hub 17 is preferably machined as a unitary part from a single piece of metal stock, but of course could be constructed in various other fashions. The second hub 17 further includes an interior bore 44, typically of circular cross section dimensioned to receive a shaft of cooperating apparatus.

The interior 49 of the retainer 19 is specially contoured, shaped and dimensioned to receive and snugly mate with the exterior lobes, e.g., 33, 34, of the insert 15 when the coupling is in the assembled state. The retainer 19 has a first face 61 (FIG. 3), which receives and passes the insert 15 into mating position with the exterior lobes 33, 34, etc., and a second face 63 (FIG. 1) which includes a depending edge or flange portion 65, which prevents the insert 15 from passing through the retainer 19, i.e., holds the insert 15 in a position wherein the insert 15 is preferably encased by the retainer 19.

In the embodiment illustrated, the width of the retainer and the width of the insert are selected such that the face 71 of the insert 15 lies flush with the edge of the first face 61 of the retainer 19, such that both the insert's face 71 and the edge 61 lie adjacent the flange face 27 in the assembled state. Thus, in assembly, the retainer 19 "captures" the insert 15 and is then attached to the first hub 13 via a number of fastening devices such as threaded bolts 73.

In one embodiment, the width of the insert mating portion 45 of the second hub 17 is preferably selected such that its interior face terminates slightly short of the face of the insert 15. Thus, the second hub 17 does not protrude through the insert 15 or extend to a point where it might contact the flange face 27 of the first hub 13.

In operation in the assembled state, the insert 15 is snugly encased and transmits torque and absorbs minor misalignment without exerting axial thrusts on the cooperating shafts to which the first and second hubs 13, 17 are respectively attached. Thus, the insert 17 does not tend to exert forces on the hubs 13, 17 tending to move them parallel to the central axis 75 of rotation in typical applications. Such forces may cause a hub to move, for example, 15 thousandths of an inch, which is undesirable or unacceptable in certain applications.

FIGS. 2-6 illustrate a flexible coupling 101 according to an illustrative embodiment, which features an improved torque transmitting insert or belt 107 interfacing with a hub 105 and a retainer 103. In one embodiment, the hub 105 and retainer 103 may be generally constructed and arranged as illustrated and described in connection with FIG. 1 but with dimensioning altered to interface with the improved torque transmitting belt 107. In illustrative embodiments, the flexible insert 107 may be constructed of a flexible or plastic material, such as, for example, a suitable urethane and may be split to facilitate wrapping around a hub 105 without having to move any equipment. The flexible insert design according to the illustrative embodiments and the cooperating shape of the interfacing receptacles of the hub and retainer yield markedly improved performance over prior art designs.

Figure 3:
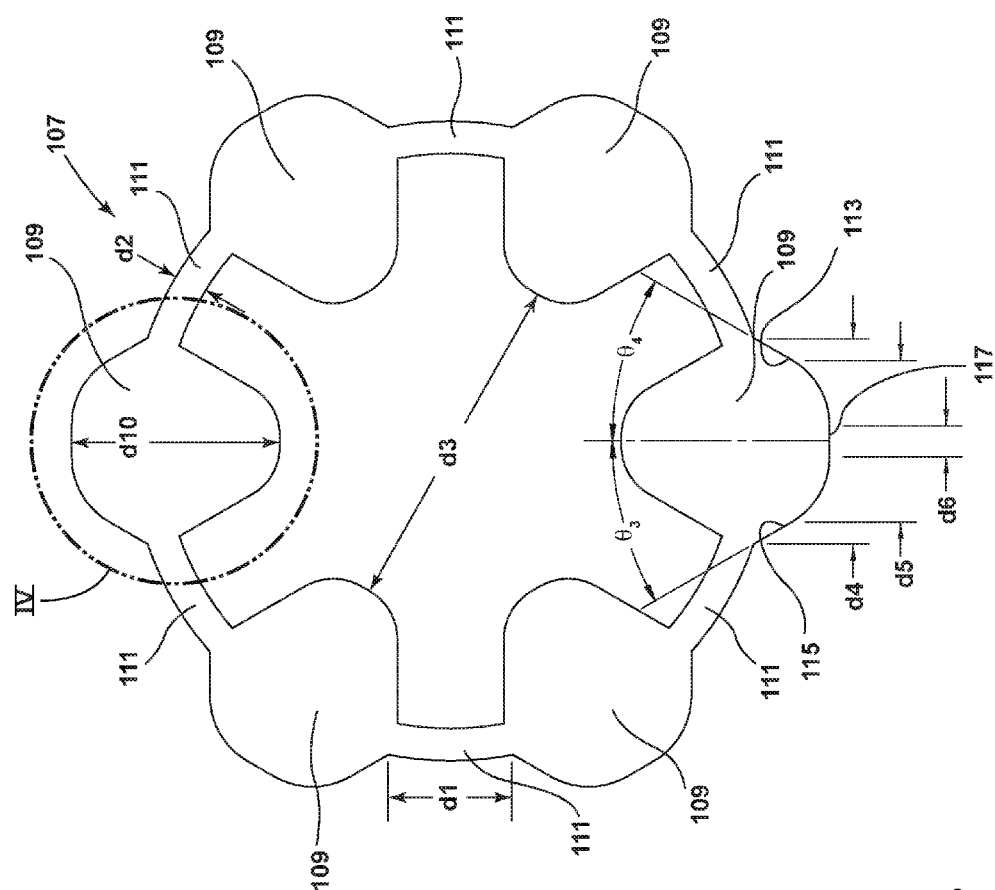
FIG. 3 is a side view of the flexible insert or belt of the coupling of FIG. 2.
Figure 5:
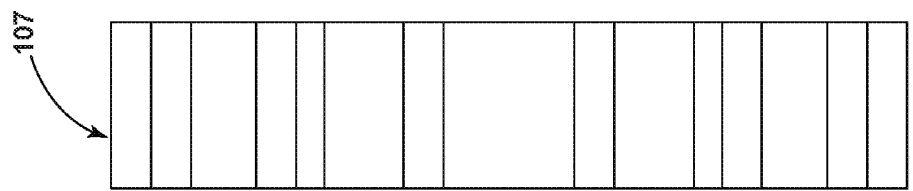
FIG. 5 is an end view of the flexible insert of FIG. 3.

In particular, with reference to FIG. 3, the insert 107 of an illustrative embodiment features a plurality of identically shaped lobes 109 interconnected by identically shaped radial segments 111, each radial segment 111 having the same radial length and the same thickness d2. In one illustrative embodiment, the diametric distance d3 between oppositely disposed lobe pairs is 2.69 inches, the distance d1 is 0.9812 inches, and the thickness d2 of each radial segment 111 is 0.2553 inches. In this illustrative embodiment, the distances d4, d5, and d6 are respectively 1.6248, 1.2765 and 0.2460 inches. These distances are the distance between the junction of the outer perimeter of a lobe 109 with its adjacent segments 111, the distance between the beginning points of the radiused or rounded portion of the outer perimeter of each lobe 109, and the width of the flat portion 117 of the tip of the outer perimeter of each lobe 109. The distance d10 between the midpoints of the inner and outer lobe perimeters in this illustrative embodiment is 1.6425 inches.

In the illustrative embodiment, each flat lobe side 113, 115, makes a respective angle Θ3, Θ4, with a vertical line bisecting the lobe 109. In one embodiment, Θ3 and Θ4 are each thirty degrees.

Figure 4:
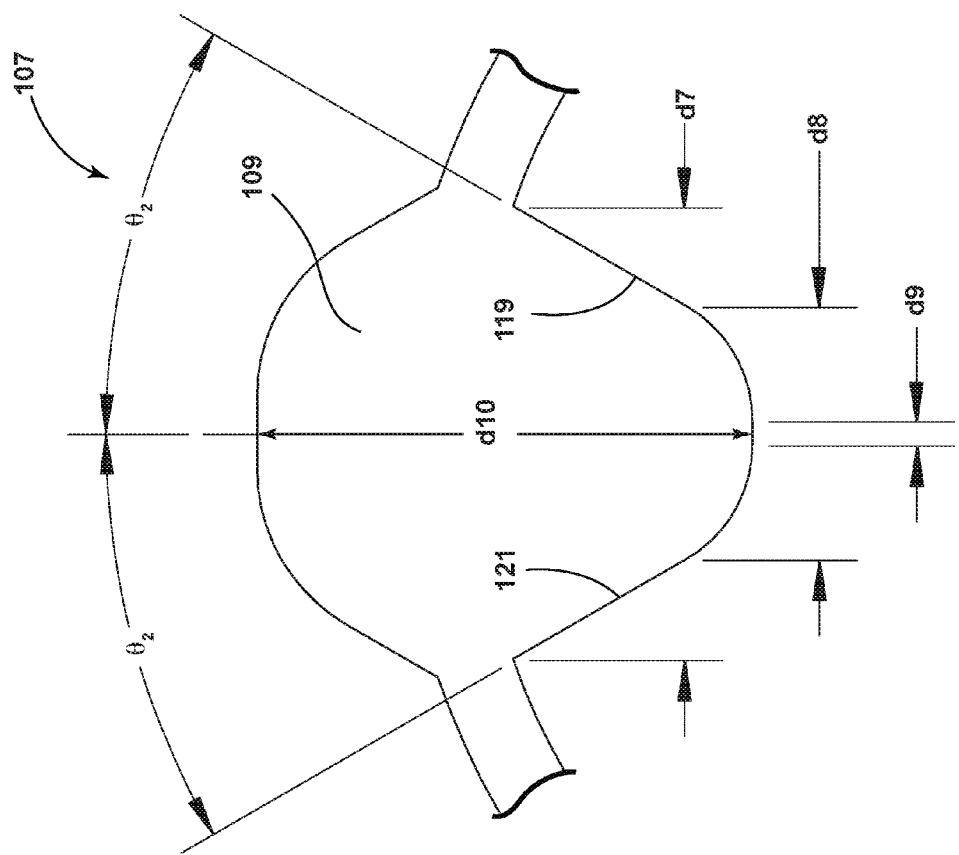
FIG. 4 is a side view of a single lobe of the flexible insert of FIG. 3.

With reference to FIG. 4, further details of the illustrative lobe 109 are provided. In particular, the linear inner lobe sides 119, 121 form respective 30 degree angles Θ1, Θ2, with a vertical line bisecting the lobe 109, while dimensions d7, d8 and d9 are respectively 1.5032, 0.8386 and 0.0808 inches. Dimension d7 is the distance between the junction of the interior of the lobe 109 with its respective adjacent segments 111, while dimension d9 is the width of the flat tip of the interior perimeter of the lobe 109. Distance d8 is the width of the rounded or radiused portion of the lobe 109 which joins the flat sides 119, 121.

Figure 6:
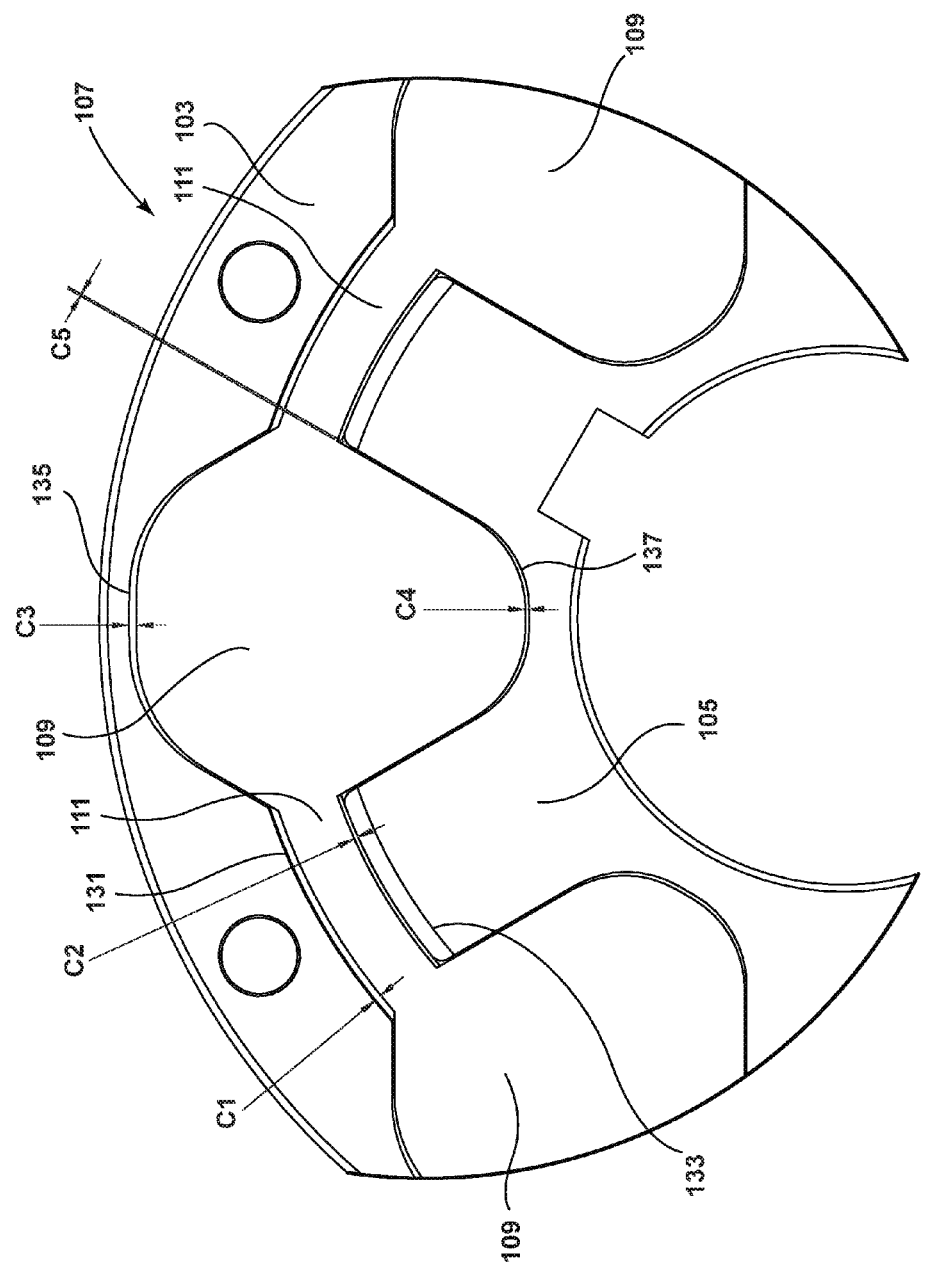
FIG. 6 is a side cross sectional detail view taken at "VI" of FIG. 1.

FIG. 6 illustrates the interface between the flexible insert 107 and it's mating retainer 103 and hub 105. In particular, in the illustrative embodiment, clearances C1, C2, C3, C4, and C5 are respectively: 0.0300, 0.0175, 0.0325, 0.0175, and 0.0088 inches. Clearances C1 and C2 are the distances between the radial segment 111 and the interior retainer surface 131 and exterior spoke surface 133, respectively. Clearances C3 and C4 are the distances between the flat surface of the outer perimeter of the lobe 109 and its mating retainer surface 135 and the distance between the flat surface of the interior perimeter of the lobe 109 and its mating hub surface 137, respectively. The clearance C5 is the distance between the flat surfaces of the interior lobe and the flat side surface of a hub spoke. As those skilled in the art will appreciate, the dimensioning of the various widths and radii illustrated in FIGS. 3, 4 and 6, of course, varies, for example, with application and size of a particular coupling. According to one embodiment, as the size (diameter) of the coupling increases, the dimensions just set forth will proportionately increase.

In the illustrative flexible insert design employing "unitary" lobes as disclosed in FIGS. 2-6, the six lobes 109 work in unison to transfer power and provide much greater drive contact with the metallic hub 105 and retainer 103 and, in illustrative embodiments, has enhanced horse power transfer capacity between the driving and driven hubs by ⅓ throughout a range of coupling sizes, while producing less axial thrust loads and spreading stress more uniformly over a larger area of the insert.

Couplings according to various embodiments disclosed herein further provide free axial float and in particular applications, enable the driving and driven shafts to be positioned at greater distances from one another, thereby accommodating greater thermal growth of shaft.

Couplings as disclosed above continue the advantage of combining advantageous aspects of both shear and compression couplings. In particular, the disclosed couplings normally operate in compression, which prevents exertion of axial thrusts, but can still shear to protect equipment in the event of lock-up or overload, etc. An example is the case of shredding apparatus used to shred recycled material, where occasionally, material will include prohibited foreign objects which can lock the shredder. In such case, the insert of a coupling according to the disclosed design will advantageously shear rather than break the associated equipment.

While the present invention has been described above in terms of specific embodiments, it is to be understood that the invention is not limited to the disclosed embodiments. The role of "driving" and "driver hubs" may be reversed and dimensioning adapted to particular sizes and conditions. Thus, the present invention is intended to cover various modifications and equivalent methods and structures included within the spirit and scope of the appended claims.

What is claimed is:

1. A flexible torque transmitting insert comprising:
a plurality of equally spaced, circumferentially disposed lobes joined to one another by a plurality of radial segments;
each lobe having an outer perimeter comprising first and second flat outer side surfaces, each extending from a junction with an adjacent radial segment, the outer perimeter further comprising a first rounded surface extending from the first flat outer side surface and a second rounded surface extending from the second flat outer side surface, the first and second rounded surfaces being joined together by a centrally located flat surface;
each lobe further having an inner perimeter comprising first and second flat inner side surfaces, each extending from a junction with an adjacent radial segment, the inner perimeter further comprising a first rounded surface extending from the first flat inner side surface and a second rounded surface extending from the second flat inner side surface, the first and second rounded surfaces being joined together by a centrally located flat surface; and
wherein each lobe comprises a solid body of flexible material in the space encompassed by said outer and inner perimeters.

2. The flexible insert of claim 1 wherein each said first and second flat outer side surfaces of said inner perimeter of a lobe makes the same first angle with a line bisecting that lobe.

3. The flexible insert of claim 2 wherein said first angle is 30 degrees.

4. The flexible insert of claim 2 wherein the first and second flat side surfaces of the outer perimeter of a lobe make the same second angle with a line bisecting said lobe.

5. The flexible insert of claim 4 wherein each said first angle and each said second angle is 30 degrees.

6. The flexible insert of claim 1 wherein the first and second flat side surfaces of said outer perimeter of a lobe make the same second angle with a line bisecting that lobe.

7. The flexible insert of claim 6 wherein said second angle is 30 degrees.

8. The flexible insert of claim 1 wherein said flexible material is a urethane material.

9. The flexible insert of claim 1 wherein each radial segment has a constant radial thickness.

10. A flexible coupling apparatus comprising:
an inner hub component;
an outer retainer component; and
a flexible torque transmitting insert adapted to transmit torque between said hub component and said retainer component comprising:
a plurality of equally spaced, circumferentially disposed lobes joined to one another by a plurality of radial segments;
each lobe having an outer perimeter comprising first and second flat outer side surfaces, each extending from a junction with an adjacent radial segment, the outer perimeter further comprising a first rounded surface extending from the first flat outer side surface and a second rounded surface extending from the second flat outer side surface, the first and second rounded surfaces being joined together by a centrally located flat surface;
each lobe further having an inner perimeter comprising first and second flat inner side surfaces, each extending from a junction with an adjacent radial segment, the outer perimeter further comprising a first rounded surface extending from the first flat inner sided surface and a second rounded surface extending from the second flat inner side surface, the first and second flat inner side surfaces being joined together by a centrally located flat surface; and
wherein each lobe comprises a solid body of flexible material in the space encompassed by said outer and inner perimeters.

11. The flexible insert of claim 10 wherein each said first and second flat outer side surfaces of said inner perimeter of a lobe makes the same first angle with a line bisecting a that lobe.

12. The flexible insert of claim 11 wherein said first angle is 30 degrees.

13. The flexible insert of claim 11 wherein the first and second flat side surfaces of the outer perimeter of a lobe make the same second angle with a line bisecting said lobe.

14. The flexible insert of claim 13 wherein each said first angle and each said second angle is 30 degrees.

15. The flexible insert of claim 10 wherein the first and second flat side surfaces of said outer perimeter of a lobe make the same second angle with a line bisecting that lobe.

16. The flexible insert of claim 15 wherein said second angle is 30 degrees.

17. The flexible insert of claim 1 wherein said flexible material is a urethane material.

18. A flexible torque transmitting insert comprising:
a flexible body of solid flexible material having a plurality of equally spaced, circumferentially disposed lobes joined to one another by a plurality of radial segments, the plurality of lobes comprising first, second, and third lobes, each positioned on the circumference of a circle, the first lobe being connected to the second lobe by a first radial segment, the second lobe being connected to the third lobe by a second radial segment, wherein the first, second and third lobes and the first and second radial segments are unitarily formed together of the same flexible material;
each of the first, second, and third lobes having an outer perimeter comprising first and second flat outer side surfaces, each extending from a junction with an adjacent radial segment, the outer perimeter further comprising a first rounded surface extending from the first flat outer side surface and a second rounded surface extending from the second flat outer side surface, the first and second rounded surfaces being joined together by a centrally located flat surface;

each of the first, second and third lobes further having an inner perimeter comprising first and second flat inner side surfaces, each extending from a junction with an adjacent radial segment, the inner perimeter further comprising a first rounded surface extending from the first flat inner side surface and a second rounded surface extending from the second flat inner side surface, the first and second rounded surfaces being joined together by a centrally located flat surface; and wherein each of the first, second, and third lobes comprise a solid body of said flexible material in the space encompassed by said outer and inner perimeters.

19. The flexible insert of claim 18 wherein said flexible material is a urethane material.

20. The flexible insert of claim 18 wherein each radial segment has the same constant radial thickness.

21. The flexible insert of claim 19 wherein each radial segment has the same constant radial thickness.

22. The flexible insert of claim 18 wherein each said first and second flat outer side surfaces of said inner perimeter of a lobe makes the same first angle with a line bisecting that lobe.

23. The flexible insert of claim 18 wherein the first and second flat side surfaces of said outer perimeter of a lobe make the same second angle with a line bisecting that lobe.

\* \* \* \* \*